Oct. 6, 1953     M. G. KURTH     2,654,618
HOSE COUPLING DEVICE FOR CONNECTION TO UNTHREADED FAUCETS
Filed Aug. 30, 1948
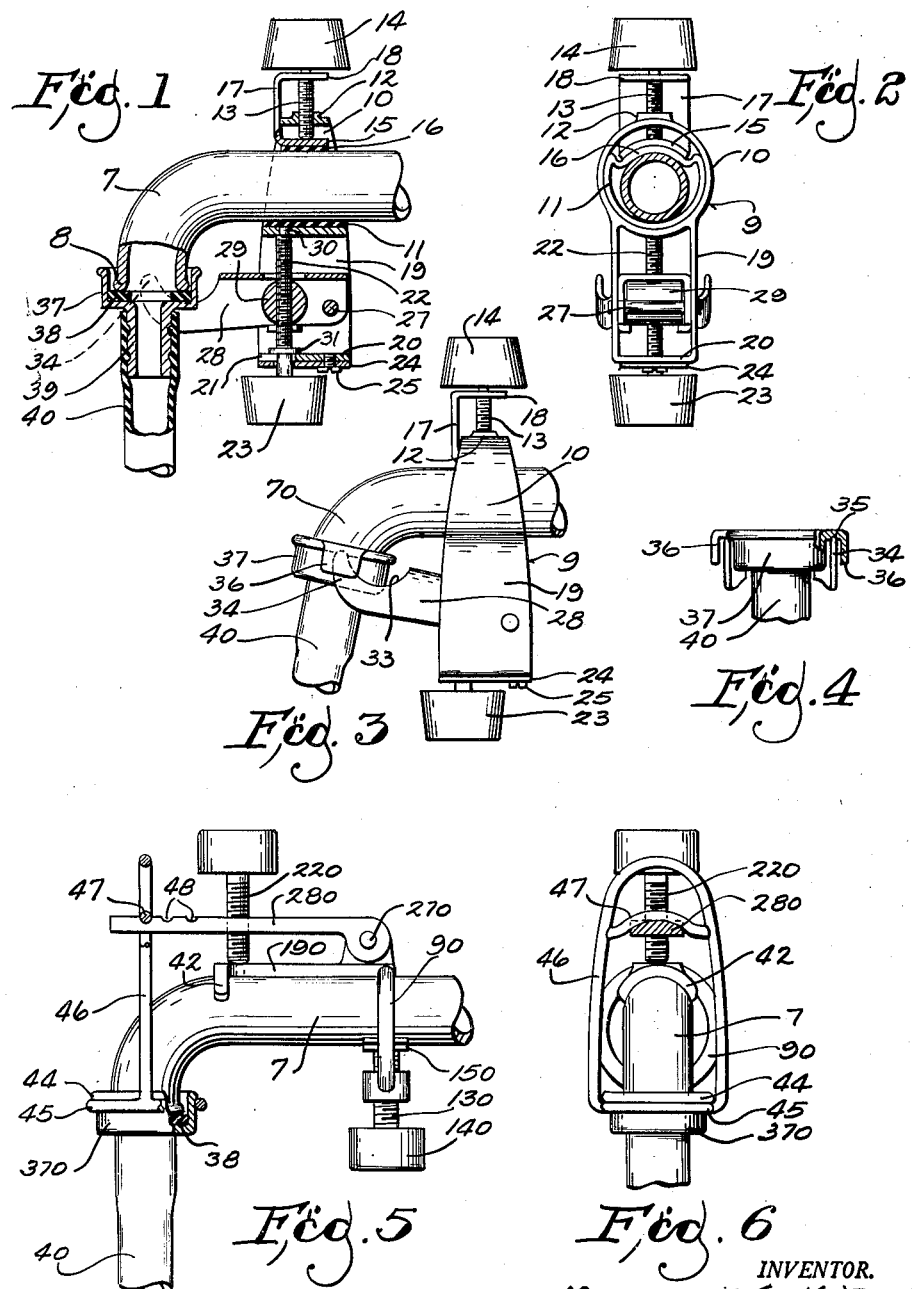
INVENTOR.
MATTHEW G. KURTH
BY
Wheeler, Wheeler & Wheeler
ATTORNEYS

Patented Oct. 6, 1953

2,654,618

UNITED STATES PATENT OFFICE 2,654,618

HOSE COUPLING DEVICE FOR CONNECTION TO UNTHREADED FAUCETS

Matthew G. Kurth, Milwaukee, Wis.

Application August 30, 1948, Serial No. 46,886

9 Claims. (Cl. 285—108)

This invention relates to an improved hose coupling connection applicable to a swing spout or other unthreaded faucet.

It is frequently very difficult to connect a hose to a faucet for the operation of a spray type dish washer or for any other purpose for which water under pressure is desired. It is a primary object of the invention to provide means whereby a hose coupling may be established to substantially any faucet, even the difficult swing-spout type. Naturally, I seek to accomplish the connection without injury to the faucet and in a manner permitting the ready detachment of hose coupling when the pressure hose connection is no longer required.

In the drawings:

Fig. 1 is a view partially in side elevation and partially in section of a swing-spout type faucet having applied thereto a device for attaching a hose coupling demountably to the spout.

Fig. 2 is a view in transverse section through the device of Fig. 1.

Fig. 3 is a view fragmentarily illustrating in side elevation portions of the device of Figs. 1 and 2.

Fig. 4 is a fragmentary detail view in front elevation of a portion of the device shown in Fig. 1.

Fig. 5 is a view largely in side elevation but partially in section showing a modified embodiment of my invention.

Fig. 6 is a view largely in front elevation but partially in section showing the device of Fig. 5.

Only the spout 7 of the faucet is illustrated. It will be noted that the spout terminates in a bead 8 and has no thread for the pressure connection of a hose therewith. The end of the faucet may be square cut as in Fig. 1, or it may be cut obliquely as in the spout 70 of Fig. 3. My improved coupling or connecting device is applicable equally to either type of faucet spout.

I provide a yoke 9 which has a spout-encircling portion 10 with a flexible liner 11 of rubber or fabric. Threaded through the boss 12 in the top of the faucet-encircling portion 10 of the yoke is a set screw 13 provided with a knob at 14 for its rotation. The lower end of the set screw engages a pressure plate 15 which is downwardly concave and lies on top of a deformed portion 16 of the liner 11. Under pressure of the screw 13 transmitted through the plate 15 to the liner 16, the liner is clamped against the faucet spout 7, the spout being confined between the bottom of the liner 11 and the deformed portion 16 thereof, thereby preserving even the most polished faucet spout from injury.

In order that the pressure plate 15 may be guided for movement vertically to and from pressure engagement with the liner 16, and to exert therethrough upon the faucet spout 7, the pressure plate 15 preferably constitutes a flange on a strap 17 which extends vertically in immediate proximity to the side of the yoke 10. At its upper end, the strap 17 is provided with another flange at 18 apertured to receive the screw 13, whereby the flange is so positioned that it can move vertically, and vertically only, respecting the spout-engaging portion 10 of the bracket 9.

Below the faucet-encircling portion 10 of the yoke 9 there is provided, preferably integrally with such yoke, a downwardly depending bracket at 19 having its bottom portion 20 notched at 21 to receive the adjusting screw 22. This screw has at 23 a knob for its rotation, this knob being desirably similar to the knob provided at 14 about the spout.

A retaining plate 24 apertured to receive the screw 22 is connected by a short bolt 25 with the bottom member 20 of the bracket to hold the screw in the slot.

Spanning the bracket between the two sides thereof and above the bottom 20 thereof is a pintle pin 27 upon which is pivoted a lever 28 carrying a nut at 29 threaded upon the adjusting screw 22. The nut may be a horizontal cylinder with a transverse vertical bore in which the screw is threaded. The upper extremity of the screw is reduced at 30 and socketed in the spout-encircling portion 10 of the yoke 9. A thrust collar 31 is fixed on the screw to engage the bottom plate 20 of the bracket and to span the slot 21. Consequently, as the screw is rotated, the threaded engagement of the screw in the nut 29 moves the lever 28 upon its fulcrum upon pintle 27.

The lever 28 comprises a downwardly opening channel, the top web and portions of the side walls of which are cut away at 33 (Fig. 3), leaving the remaining portions of the two sides of the channel to form upwardly extending fingers 34 which are centrally engaged in recesses 35 formed within the depending ears 36 of a coupling member 37. The coupling member is interiorly provided with a gasket 38, and it has a downwardly extending tubular stem at 39 with which the hose 40 is engaged in any usual or desired way.

In effect, the coupling member is pivoted transversely on the apices of the respective fingers 34 so that it is adapted to engage either a transversely cut spout such as that shown in Fig. 1, or an oblique spout terminus such as that shown in Fig. 3. The movement in either case of the coupling member to and from the end of the spout is effected simply by using the knob 23 to rotate the clamping screw 22. Since the coupling member 37 is loosely pivoted on the ends of the fingers 34, it will be apparent that as soon as the screw is rotated sufficiently to release the clamping pressure on the coupling member, the latter may be lifted from the fingers and wholly removed from the faucet, leaving flow from the faucet entirely unobstructed.

The construction shown in Figs. 5 and 6 is very similar in principle to that already described. There is a yoke at 90 which encircles the spout 7 in a manner similar to that of yoke 9. In this instance, however, the clamping jaw 150 is disposed beneath the spout and is pressed upwardly by the set screw 130 when the knob 140 is rotated.

The bracket 190 of this device lies on the upper side of the spout and is positioned thereon by a saddle member 42. Pivoted to the bracket by means of the pintle bolt 270 is a lever 280 corresponding in function to the lever 28 but located, in this device, above the spout. The adjusting screw 220 is threaded directly into the lever 280 and engages the bracket to move the lever upwardly or, when unscrewed, to permit the lever to move downwardly.

The coupling member 370 has a marginal bead at 44 encircled by a ring 45 supported by a loop-shaped link 46 from the lever 280. The top of the loop may be engaged with the lever in one adjustment of the parts, but, as shown, the lever engages a transverse member 47 of the loop to provide a closer coupling. Further adjustment is provided by means of notches 48 at intervals on the top surface of the lever to facilitate the connection of the linkage at various angles and positions.

When the screw 220 is turned downwardly, the lever 280 is caused to pivot in a clockwise direction about its pintle pin 270, thereby subjecting the linkage 46 to tension which draws the coupling member 370 snugly into engagement with the faucet upon the intervening gasket 38. When the pressure of screw 220 is relaxed by turning the screw in the opposite direction, the entire linkage 46 is readily removable from lever 280 by swinging it over the free end of the lever, thereby completely releasing the coupling and the hose for bodily removal from the faucet, leaving the mouth of the spout wholly unobstructed.

While the two devices are quite distinctly different in detail, it will be noted that in each case there is a spout-encircling yoke and a bracket mounted thereon for support from the spout and an arrangement whereby a set screw rotatable respecting the bracket operates a lever pivoted to the bracket for applying supporting pressure to a gasketed coupling member to which the hose is connected. Thereby the coupling member is moved in each case into pressure engagement with the faucet, and in each case the coupling member is adapted to engage faucets of various terminal construction regardless of the absence of any coupling threads.

In each case, moreover, the coupling member and hose may be bodily removed with facility and convenience by simply rotating in a reverse direction the clamping screw which provides pressure engagement between the parts.

I claim:

1. In a device of the character described, for attaching a hose to a faucet spout not provided with threaded connections, the combination with a spout-embracing yoke having spout-clamping means to secure the yoke on the spout, of a bracket connected with the yoke to be fixedly mounted thereby on the spout, a lever pivoted to the bracket, a screw separate from said yoke clamping means and adjustable between the bracket and the lever for effecting pivotal movement of the lever respecting the fixed bracket, and a spout-engaging coupling movable to and from operative spout engagement and connected with the lever to be actuated thereby into pressure engagement with the spout.

2. The device of claim 1 in which the yoke has a deformable lining, and the clamping means acts through a deformable portion of the lining to secure the yoke upon the spout.

3. The device of claim 1 in which the clamping means for connecting the yoke with the spout comprises a set screw disposed above the spout, the bracket being beneath the spout, and the lever being provided with hooked arms engageable with portions of the coupling member from beneath, the coupling member being freely removable from such arms.

4. The device of claim 1 in which the yoke has its clamping means disposed beneath the spout, the lever being above the spout, and the lever adjusting screw being threaded to the lever and engageable with the bracket, the lever having a free end portion projecting beyond said screw, and the coupling member having linkage connecting it detachably with the free end portion of the lever.

5. The combination with a spout, of a yoke having a spout-embracing ring portion of materially greater diameter than the spout whereby said ring will interchangeably fit spouts of varying diameter, a liner for the ring having a deformable portion, a pressure plate interposed between the deformable portion of the liner and the ring, and a set screw threaded in the ring and engageable with said plate for applying pressure to said plate and through said deformable liner portion to the spout within the liner and ring, the liner at the side of the ring opposite the pressure plate being in direct contact with the ring, said pressure plate being provided with a guide strap extending upwardly from said plate along one side of said ring and having an upper guiding connection with said set screw whereby said plate is constrained for substantial vertical movement only.

6. In a device of the character described, a spout-engaging yoke having faucet spout clamping means, a bracket fixedly connected with said yoke and extending downwardly therefrom, a pintle connected with the fixed bracket, a lever pivoted upon the pintle and projecting forwardly toward the mouth of the spout, a coupling member pivotally supported on the free end of the lever, and a set screw separate from the spout clamping means and operable between the bracket and the lever for the actuation of the lever in a direction to elevate said coupling member toward the end of the spout to effect a coupling thereto.

7. The device described in claim 6 in which said lever comprises a downwardly opening channel having a web portion cut away at the free end of the lever, and the side portions of the channel being extended in the form of upwardly projecting fingers upon which said coupling member is pivotally supported and from which it is freely removable.

8. In a device of the character described, the combination with a yoke having a faucet-engaging clamp and provided with a saddle for positioning it upon the top of a faucet spout, of a lever pivoted to said member, a set screw threaded in the lever and engageable with said member, said lever projecting beyond the set screw, a link connected with the portion of the lever so projecting, and a coupling element suspended by said link from said lever for movement therewith to and from clamping engagement with a faucet spout.

9. The device of claim 8 in which the link has a transverse bar and an upper bar selectively engageable with said lever.

MATTHEW G. KURTH.

References Cited in the file of this patent

UNITED STATES PATENTS

| Number | Name | Date |
|---|---|---|
| 866,395 | Skinner et al. | Sept. 17, 1907 |
| 1,345,396 | Papini | July 6, 1920 |
| 1,537,797 | Bunbury | May 12, 1925 |
| 1,946,832 | Brandon | Feb. 13, 1934 |
| 1,986,225 | Sefkin | Jan. 1, 1935 |
| 2,134,655 | Tornblom | Oct. 25, 1938 |
| 2,326,213 | Gorrien | Aug. 10, 1943 |
| 2,379,893 | Ellinwood | July 10, 1945 |
| 2,535,092 | Rettinger | Dec. 26, 1950 |

FOREIGN PATENTS

| Number | Country | Date |
|---|---|---|
| 8,516 | Australia | Aug. 1, 1932 |
| 382,334 | Great Britain | Oct. 27, 1932 |